United States Patent [19]
Willsey

[11] 4,111,111
[45] Sep. 5, 1978

[54] SEPARATING MECHANISM FOR EGG BREAKING MACHINE

[76] Inventor: Charles H. Willsey, Rte. 1, Maple Hill, Kans. 66507

[21] Appl. No.: 601,655

[22] Filed: Aug. 4, 1975

[51] Int. Cl.$^2$ .............................................. A23J 1/09
[52] U.S. Cl. ..................................... 99/499; 99/500; 99/538
[58] Field of Search ................ 99/538, 499, 497, 500, 99/498; 210/534

[56] References Cited

U.S. PATENT DOCUMENTS

| | | | |
|---|---|---|---|
| 718,179 | 1/1903 | Voigt | 99/499 |
| 1,759,512 | 5/1930 | Kramer et al. | 99/500 |
| 2,060,683 | 11/1936 | Mohr | 99/499 |
| 2,150,719 | 3/1939 | Milward | 99/499 |
| 2,212,328 | 8/1940 | Scurlock | 99/497 |
| 2,473,411 | 6/1949 | Boden | 99/500 |
| 3,111,150 | 11/1963 | Shelton et al. | 99/498 |

*Primary Examiner*—Richard E. Aegerter
*Assistant Examiner*—L. Footland
*Attorney, Agent, or Firm*—Guy A. Greenawalt

[57] ABSTRACT

An apparatus for use in machines for cracking shell eggs and separating the yolks from the albumen which comprises a separating assembly having a top bowl-forming member for receiving the egg contents which is mounted above a bottom pan or tray for collecting the albumen, which bowl member is constructed to provide an open top portion into which the egg contents is adapted to be dumped and a bottom portion in which the yolk settles while the albumen is separated by draining into the bottom collecting pan through a specially formed slot in the upstanding wall of the bowl.

4 Claims, 6 Drawing Figures

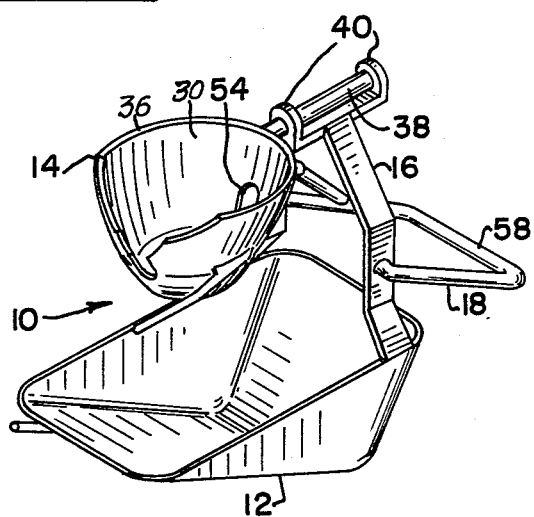
Fig-1-
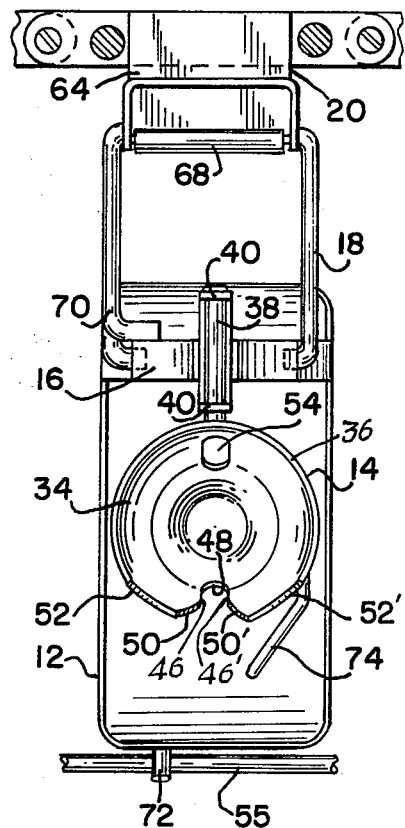
Fig-2-
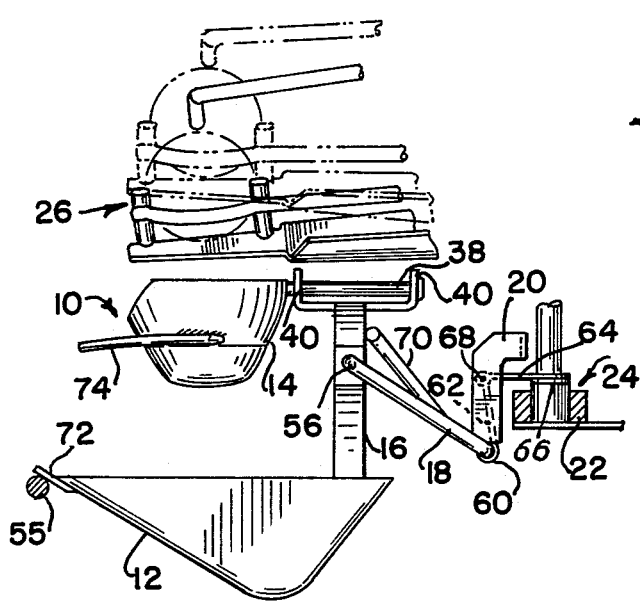
Fig-3-
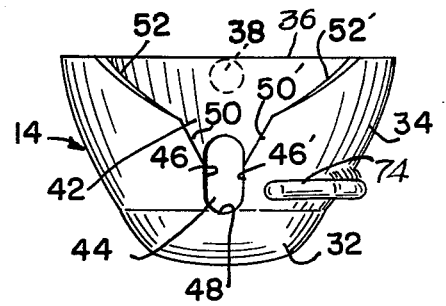
Fig-5-

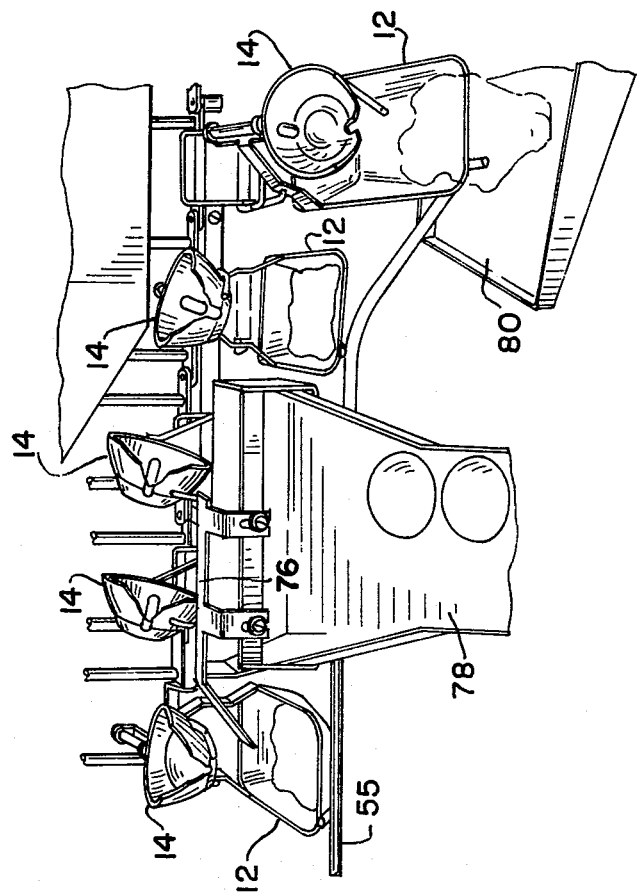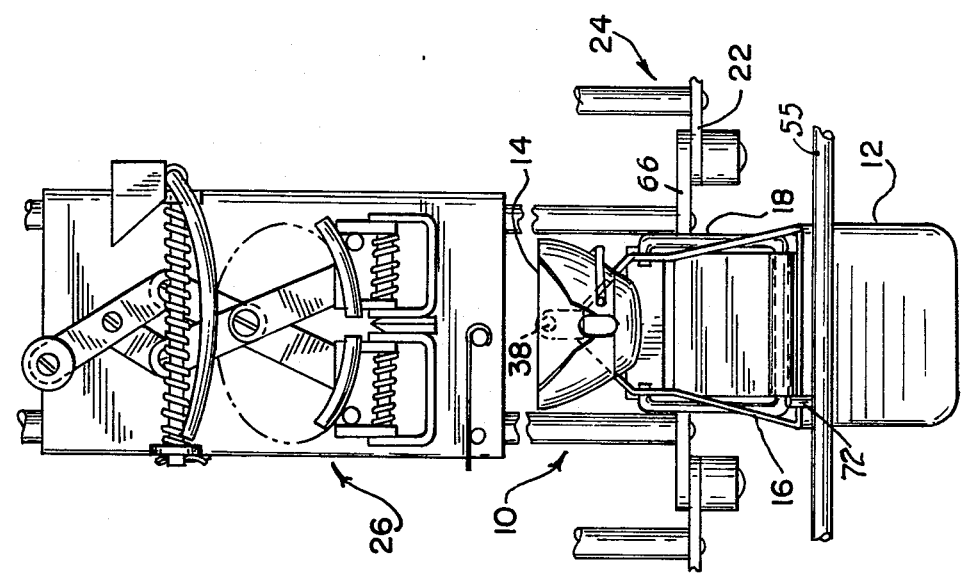

SEPARATING MECHANISM FOR EGG BREAKING MACHINE

This invention relates to egg processing equipment of the type which breaks and separates the contents of shell eggs and is more particularly concerned with improvements in the mechanism employed in such machines for separating the albumen or whites from the yolks.

In the development of machinery for breaking shell eggs and separating the albumen from the yolks to which the albumen tends to cling, one of the principal objectives has been to achieve the highest possible degree of separation, since a greater commercial value is placed on the yolk and its value is increased by raising the purity factor.

A number of separating arrangements which have been suggested have not proven successful, generally, for lack of a satisfactory degree of separation or because of excessive yolk breakage, high cost, poor efficiency or various other deficiencies. Commercially successful machines have been developed which employ separating devices which achieve a relatively high degree of separation. In the machine shown in my U.S. Pat. No. 3,480,056, granted Nov. 25, 1969, which has enjoyed considerable commercial use, a high degree of separation has been achieved by employing a separating cup in the form of a half cylinder, with an open top through which the contents is received and mounted to pivot on a horizontally disposed long axis from an upwardly opening, contents receiving position to a contents dumping position and having semi-circular drainage slots in the bottom of the otherwise closed end members through which the albumen will drain prior to dumping the yolk which remains in the bottom of the cup. Other separating arrangements have been employed in my earlier developed cracking and separating machines. In the machines shown in my U.S. Pat. Nos. 2,818,096, granted Dec. 31, 1957, and 2,723,695, granted Nov. 15, 1955, a small yolk cup is positioned at the open side of a pan into which the egg contents is initially dumped. A curved wire or rod is spaced a short distance above the outermost edge of the cup for holding the yolk in the cup while the pan and cup are tilted so that the white drains off over the edge of the cup and beneath or over the yolk retaining wire. In the machines shown in my U.S. Pat Nos. 2,815,055, granted Dec. 3, 1957 and 2,760,536, granted Aug. 28, 1955, separation is achieved by a valve lift-type arrangement in which a small yolk cup is pin mounted for vertical reciprocation in a contents receiving bowl having an open top and openings in the bottom which are initially closed by the cup when the contents is dumped and which are opened when the cup is raised and the white is allowed to separate by spilling over the edge of the cup. All of these arrangements have been capable of achieving a commercially acceptable degree of separation. However, it has been recognized that an increase in the percentage of separation would be advantageous if obtainable without materially increasing manufacturing and maintenance costs and without any changes which would decrease the efficiency of the machines with respect to other operations in the handling of the product. It is a general object, therefore, of the present invention to provide an improved mechanism for separating the albumen from the yolk in an egg cracking and contents separating operation which is simple in construction and which operates in a highly efficient manner to achieve maximum separation of the albumen from the yolk without an unacceptable amount of yolk breakage.

A more specific object of the invention is to provide in a shell egg breaking and contents separating operation, an improved arrangement for separating the egg contents which is released from the broken shell portions which arrangement is characterized by a contents receiving bowl member having provision for enabling the albumen to separate to a large extent in a single cohesive mass and pass through an aperture in the upstanding wall of the bowl while the yolk is retained in the bottom of the bowl for subsequent removal when the separation of the albumen is accomplished.

Another object of the invention is to provide an egg contents separating mechanism which is adapted for incorporation in an egg breaking and separating machine and which takes advantage of the relative weight and characteristics of the elements in the contents of an average egg, wherein the separating mechanism is in the form of an upwardly opening bowl member having a configuration conforming generally to the configuration of half an egg shell with a top rim or edge section through which the contents of an egg is received and a bottom section into which the egg yolk is adapted to settle so as to be retained therein while the albumen is drained from the bowl through an upwardly opening, vertical slot in the side wall of the bowl which extends upwardly of the yolk accommodating bottom section.

A further object of the invention is to provide a separating mechanism adapted for incorporation in an egg cracking and contents separating machine which is in the form of an open top bowl member having a configuration simulating half an egg shell with a bottom portion which is formed to support the natural configuration of the yolk sac while the albumen is separated from the yolk by draining through one or more vertically extending slots in the upwardly curved side wall of the bowl member which extend above the bottom portion and one of which slots is proportioned so as to enable all or the greater portion of the albumen to pass therethrough in a cohesive mass while retaining the yolk in the bottom portion, the bowl member being mounted so that it may be tilted about a pivot axis for dumping the yolk independently of the albumen.

A still further object of the invention is to provide an egg contents separating mechanism which includes a bowl-shaped receptacle mounted above an albumen collecting means preferably in the form of an open top pan, the bowl having an open top for receiving the egg contents, with a bottom section of a size to accommodate an egg yolk and an upwardly and outwardly extending, peripheral side wall of sufficient depth to accommodate the contents of an egg, which side wall has a pair of oppositely disposed slot formations therein, one of which opens upwardly and is of sufficient size and configuration to allow a relatively large mass of albumen to pass therethrough while the yolk settles into and is retained in the bottom section, the receptacle having a pivot mounting for movement on a transverse axis extending outboard of a carrying conveyor so as to enable the separated yolk to be dumped independently of the albumen in a convenient manner, the one slot which opens upwardly being formed with side edges having upper portions diverging upwardly to the top edge of the bowl, thereby enabling the bulk of the albumen, which is in the form of a relatively soft, flowable, jell-like mass, to quickly exit the bowl, including the greater portion of the inner layer of the albumen which, under normal conditions, clings to the contacting surface of the yolk sac. The greater weight of the cohesive albumen mass is in the middle layer, and together with the weight of the outer layer, which is initially separated from the shell membrane when the contents is dumped, tends to pull the albumen inner layer free of the yolk sac and out of the bowl.

These and other objects and advantages of the invention will be more apparent when reference is made to the accompanying detailed description of the preferred embodiment of the invention which is set forth therein, and shown by way of example in the accompanying drawings wherein:

FIG. 1 is a perspective view of an egg contents separating assembly which embodies therein the principal features of the invention;

FIG. 2 is a plan view of the assembly of FIG. 1 with the assembly shown attached to a supporting conveyor of a cracking and separating machine and in the position in which it is adapted to receive the contents of an egg from an associated cracking assembly mounted above the same;

FIG. 3 is a side elevation showing the separating assembly of FIGS. 1 and 2 with a portion of an associated cracking assembly indicated above the same;

FIG. 4 is an elevational view showing the separating bowl and albumen collecting pan together with an associated cracking assembly mounted above the same;

FIG. 5 is an elevational view, to an enlarged scale, showing the outboard side of the separating bowl; and FIG. 6 is an elevational view showing the manner in which the separating bowl and albumen collecting pan are each tilted to dump the contents into separate chutes for discharge into product receiving containers.

Referring to the drawings, there is illustrated an egg contents separating assembly which incorporates therein the principal features of the present invention. For the purpose of illustration and to aid in fully understanding the operation and advantages of the presently preferred form of the invention reference may be had to U.S. Pat. No. 3,480,056 in which there is disclosed a machine for carrying out a complete shell egg breaking and contents separating operation which employs a plurality of conveyor carried cracking heads and associated separating assemblies, the latter including a contents receiving and separating bowl assembly for which the present separating bowl assembly may be substituted with a resulting increase in the degree of separation achieved in the operation of the machine. While the illustrated form of the present separating mechanism has been designed for incorporation in a machine of the type disclosed in my U.S. Pat. No. 3,480,056, it will be understood that it is not intended to limit the use of the present mechanism to such machines.

The separating assembly 10 which is illustrated in FIGS. 1 to 5 comprises a bottom or lower albumen collecting means in the form of a tray or pan 12 and a separating bowl 14 which is supported above the pan 12 by means of an inverted U-shaped bracket 16 upstanding from the back or inboard portion of the pan 12. The pan 12 is supported at its inboard side by a bail formation 18 and a co-operating bracket 20 which is carried on a traveling chain, indicated at 22, and forming the lowermost chain member in a multi-chain conveyor 24 on which the separating assembly 10 and an associated cracking head assembly 26, a part of which is indicated in FIG. 3, are carried. A detailed description of the cracking head assembly 26 and the conveyor 24 with associated mechanism may be found in U.S. Pat. No. 3,480,056. The cracking head assembly 26 is vertically aligned above the pan 12 and the associated bowl 14. It is operative to break an egg and open the two halves, which result from the breaking so as to discharge or dump the egg contents into the top of the separating bowl 14, in the same manner as disclosed in U.S. Pat. No. 3,480,056, where the albumen which is separated from the yolk drains into a collecting means of the same character as the collecting pan 12 which is aligned beneath the bowl 14 in the illustrated form of the present invention.

The bowl 14 has the general form of a shell half and is of sufficient size to accommodate the contents of an egg. It is understood that the egg contents comprises a yolk sac filled with a gelatenous mass of yolk product, which, in the egg, is suspended in a cohesive mass of albumen product, with the latter comprising an outer layer clinging to the inner shell surface, an inner layer clinging to the yolk sac and an intermediate layer which has a weight exceeding the weight of the outer and inner layers combined. The entire contents is flowable under normal conditions with the albumen becoming less cohesive and more fluid under certain conditions. The bowl 14, which is disposed in an upwardly opening position to receive the egg contents, comprises an open top 30 of sufficient diameter to pass therethrough the yolk sac and accompanying albumen, which will be dropped by the operation of the cracking or breaking head assembly 26 from a point close to the top of the bowl 14, so as to minimize the risk of yolk sac breakage. The contents will tend to drop into the bowl in a relatively large mass, the weight tending to pull the albumen outer layer free of the membrane connecting it with the shell inner surface. The bowl 14 has a closed bottom portion 32 of cup-like form which is shaped or formed to support the natural configuration of the yolk sac so as to minimize the likelihood of yolk sac rupture through stressing or stretching of the membrane which constitutes the yolk sac. It is of sufficient dimensions to accommodate the yolk sac which tends to settle to the bottom of the bowl and pushes the albumen upwardly. The peripheral side wall 34 of the bowl 14 curves upwardly and outwardly to the generally circular top rim 36 a sufficient distance to accommodate the contents of an egg. A supporting pivot pin 38 extends radially of the top rim member 36 and is adapted to be pivotally mounted in a pair of spaced, upstanding trunnion members 40 on the top of the bracket 16 which is upstanding from the pin 12. The side wall 34 is provided at the outboard side with an upwardly opening slot formation 42 extending upwardly from adjacent the top edge of the bottom yolk cup forming section 32. The bottom portion 44 of the slot formation 42 which is relatively narrow with parallel, laterally spaced side edges 46, 46' and a rounded edge 48 extends only a short distance upwardly to a point where the side edges merge with upwardly diverging edge portions 50, 50' which, in turn, extend upwardly a relatively short distance to edge portions 52, 52' which diverge to a greater degree upwardly and extend to the top rim or edge 36 of the bowl member. The configuration of the slot 42 enables the bulk of the albumen, which rides on the top of the yolk when the egg contents settles into the bottom of the bowl 14, to flow through the slot 42 in a cohesive mass with the weight tending to pull the albumen inner layer along with it and dragging the entire albumen contents out of the bowl, thereby freeing the albumen from the yolk sac which is confined therein by the side wall 34 and the narrow configuration of the bottom portion 44 of the escape slot 42.

The bowl side wall 34 is provided with a relatively small, generally rectangular slot 54 in the side wall 34 which extends vertically in the wall 34 beneath the pivot pin 38 from a point adjacent the top edge of the bottom cup formation 32 a short distance upwardly. The slot 54 is disposed opposite the slot 42 and enables any part of the albumen which remains in the bowl and does not exit through the slot 44 to drain off into the pan 12. This aids in the separation, particularly, when the egg contents is excessively fluid, which occurs when the albumen loses its normal cohesiveness and breaks into separate segments.

The albumen collecting pan, as illustrated, is of the same construction as the albumen collecting pan in U.S. Pat. No. 3,480,056. It is triangular shaped with the inboard end supported by the bail-like member 18 and the outboard end supported on a cam rail 55. The U-shaped bail member 18 has the ends of its legs pivoted in bearing apertures 56 in the upstanding bracket member 16. The cross bar portion 56 of the bail or pivot link 18 is adapted to seat in a bearing formation provided by the upturned bottom margin or lip 60 of a flange member 62 which depends from the outboard edge of a support bracket 64 mounted on the link plate 66 of the chain 22. A U-shaped latch member 20, pivoted at 68, is provided to close the bearing groove formed by the lip 60 which may be swung to release the bale member 18 for removal of the pan 12 when desired. An L-shaped arm 70 on the pivot link 18 limits movement about the pivot apertures 56. A pin 72 on the outboard edge of the pan enables the operator to swing the assembly about the pivot points 56 and 60 so as to cause the assembly to swing downwardly on the pivot point 60 and dump an egg contents which is spoiled or has a broken yolk.

In using the illustrated separating assembly the contents of an egg is dumped into the assembly 10 by operation of the associated cracking head assembly 26 and separation occurs immediately or while the assemblies are advanced by the conveyor 24 along an inspection path to a dumping area (FIG. 6), the path being of sufficient extent to allow for drainage of any albumen which may not exit the slot 42 with the initial mass of the albumen. The separating assembly 10 is supported by engagement of the outwardly projecting pin member 72 on the outer edge of the albumen collecting pan 12 with a supporting cam bar or rail 55 as it is advanced. At the dumping area a cam rod 74, which is secured to the outboard area of the side wall 34 and extends outboard of the bowl, engages the cam bar 76 (FIG. 6) so as to pivot the bowl 14 to dumping position and discharge the yolk into a collecting chute 78 for discharge from the machine while the albumen pan is allowed to swing to a position to dump the albumen in the chute 80 for discharge from the machine.

While, in the form illustrated, the bowl 14 is mounted on the pivot pin 38 which is supported for turning movement about its longitudinal axis, it may be desirable to mount the bowl 14 in fixed relation to the albumen collecting pan 12 so as to tilt with the pan 12 during dumping operations.

I claim:

1. In a machine for breaking shell eggs and separating the contents of each egg, a separating assembly adapted to the positioned to receive the contents of an egg which is discharged in flowable condition from a breaking and dumping mechanism, said separating assembly comprising an albumen collecting means in the form of a pan and a member for initially receiving the egg contents and for separating the albumen from the yolk which is disposed vertically above said collecting means and which is in the form of an upwardly opening, bowl-shaped container having an upper edge which is generally circular and of a diameter sufficient to receive the contents of an egg from a breaking mechanism disposed vertically above the same, said bowl shaped container having side wall portions depending from said upper edge and tapering inwardly to an imperforate bottom portion which is formed of a size and shape to support the natural configuration of the yolk sac, means at one side of said bowl shaped container supporting said container in upwardly opening, generally horizontal position for receiving the whole egg contents, said side wall portions having a slot formation which is peripherally spaced relative to said supporting means and which extends upwardly in a vertical direction from adjacent the top edge of said bottom portion, which slot formation comprises a realtively narrow bottom portion extending a short distance above said container bottom portion and a wider top portion which enables a relatively large mass of albumen to pass as a unit through said vertically extending slot into said albumen collecting means while said container remains in generally horizontal contents receiving position and while the yolk remains supported in said bottom portion thereby enabling the albumen to be separated from the yolk.

2. An egg contents separating mechanism adapted for incorporation in an egg breaking and contents separating machine, said mechanism being adapted to be positioned to receive the albumen and yolk of an egg which is discharged in flowable condition from a cracking apparatus, said separating assembly comprising a pan-like albumen collecting means and a separating member mounted immediately above said collecting means which is in the form of a bowl-like container, said separating container member opening upwardly so as to receive the yolk and the albumen, said separating container member having a generally circular top edge which extends peripherally in a common plane and side wall portions which depend therefrom and which converge inwardly and terminate at a closed bottom portion which is formed to support the natural configuration of the yolk sac and into which the yolk is adapted to settle when the separating container is in upwardly opening position and the egg contents is received therein, said side wall portions having a vertical slot extending upwardly from the top edge of said bottom portion which slot is defined by a relatively narrow bottom edge formation and spaced, generally parallel, side edge formations terminating at upwardly diverging side edge formations which extend to points at said top edge which are spaced apart a substantially greater distance than the spacing of the bottom side edge formations thereby enabling substantially all of the albumen to quickly separate from the yolk and drain through said slot in a cohesive mass for deposit in said albumen collecting means which is positioned beneath said separating container member while the yolk is supported in said bottom portion of said separating container member.

3. An egg contents separating mechanism as set forth in claim 2 wherein said bowl-like separating container member has a relatively small narrow opening in a portion of the side wall which is disposed opposite said vertical slot and which opening extends from adjacent the top edge of said yolk receiving bottom portion to a point which is a relatively short distance above the same, thereby enabling discharge through said opening of any small albumen portion which may not drain through said vertical slot.

4. An egg contents separating mechanism as set forth in claim 2 wherein said bottom edge formation of said vertical slot is rounded and merges into said side wall edge formations which extend upwardly at opposite sides of said bottom edge formation to middle portions of said side edge formations where they diverge upwardly and merge with top side edge portions having a somewhat greater degree of upward divergence and extending to said spaced apart top edge points so as to provide a progressively wider slot for the passage of said albumen in a cohesive mass.

* * * * *

REEXAMINATION CERTIFICATE (2501st)
United States Patent [19]
Willsey

[11] B1 4,111,111

[45] Certificate Issued Mar. 14, 1995

[54] SEPARATING MECHANISM FOR EGG BREAKING MACHINE

[76] Inventor: Charles H. Willsey, Rte. 1, Maple Hill, Kans. 66507

Reexamination Request:
No. 90/003,322, Jan. 27, 1994

Reexamination Certificate for:
Patent No.: 4,111,111
Issued: Sep. 5, 1978
Appl. No.: 601,655
Filed: Aug. 4, 1975

[51] Int. Cl.⁶ .............................. A23J 1/09
[52] U.S. Cl. ........................ 99/499; 99/500; 99/538
[58] Field of Search .................. 99/495–500

[56] References Cited

U.S. PATENT DOCUMENTS

| | | |
|---|---|---|
| 718,179 | 1/1903 | Voigt . |
| 1,759,512 | 5/1930 | Kramer et al. . |
| 2,060,683 | 11/1936 | Mohr . |
| 2,150,719 | 3/1939 | Milward . |
| 2,212,328 | 8/1940 | Scurlock . |
| 2,473,411 | 6/1949 | Boden . |
| 2,523,777 | 9/1950 | Polcar . |
| 3,111,150 | 11/1963 | Shelton et al. . |
| 4,111,111 | 9/1978 | Willsey . |

*Primary Examiner*—Timothy F. Simone

[57] ABSTRACT

An apparatus for use in machines for cracking shell eggs and separating the yolks from the albumen which comprises a separating assembly having a top bowl-forming member for receiving the egg contents which is mounted above a bottom pan or tray for collecting the albumen, which bowl member is constructed to provide an open top portion into which the egg contents is adapted to be dumped and a bottom portion in which the yolk settles while the albumen is separated by draining into the bottom collecting pan through a specially formed slot in the upstanding wall of the bowl.

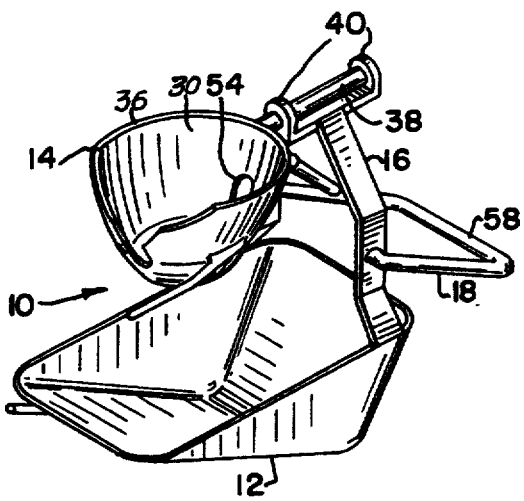

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4 is confirmed.

Claims 1, 2 are cancelled.

* * * * *